United States Patent [19]

Hill

[11] 4,250,154
[45] Feb. 10, 1981

[54] RE-POST PRECIPITATION CONTROL

[75] Inventor: Richard N. Hill, Lakeland, Fla.

[73] Assignee: W. R. Grace & Co., New York, N.Y.

[21] Appl. No.: 86,640

[22] Filed: Oct. 22, 1979

[51] Int. Cl.³ ............................................. C01B 25/16
[52] U.S. Cl. ................................. 423/317; 423/321 R
[58] Field of Search ............ 423/317, 319, 320, 321 R

[56] References Cited

U.S. PATENT DOCUMENTS

| Re. 29,149 | 3/1977 | Young ................................... 423/313 |
| 3,361,187 | 1/1968 | Hudson et al. .................. 423/321 X |
| 4,110,422 | 8/1978 | Hill ....................................... 423/317 |

*Primary Examiner*—O. R. Vertiz
*Assistant Examiner*—Gregory A. Heller
*Attorney, Agent, or Firm*—Charles L. Harness

[57] ABSTRACT

Prevention of re-post precipitation in concentrated wet process phosphoric acid by heating the acid at 55° to 85° C. thereby to dissolve solids without substantial re-post precipitation.

6 Claims, No Drawings

RE-POST PRECIPITATION CONTROL

The Hill process for the post precipitation in phosphoric acid is well known. It is the subject of U.S. Pat. Nos. 4,110,422 and 4,164,550, and at this writing it is in commercial use in facilities operated by W. R. Grace & Co. in Bartow, Fla.

In summary the Hill process starts with crude phosphoric acid, suitably 26–36% $P_2O_5$, e.g., the No. 1 filtrate, 30% $P_2O_5$. This material is thoroughly clarified with conventional flocculants. Then perlite or other suitable aluminum silicate is added, suitably in an amount of 8–16 pounds per ton of contained $P_2O_5$. The perlite-acid mix is then concentrated in conventional evaporators to about 50% $P_2O_5$ acid and this material is sent to a crystallizer where solids drop out of the acid. The underflow from the crystallizer is returned to the train, suitably to the clarifier. The overflow is generally concentrated further, e.g., up to 57–63% $P_2O_5$, and typically 60% $P_2O_5$. Under the preferred conditions of operation the product leaving the final evaporator is very low in solids and further precipitation is negligible, even during storage for some weeks thereafter and shipment of many hundreds of miles.

On the other hand, despite the general overall satisfactory character of the Hill process, it is susceptible to occasional variation, stemming generally from variations in phosphate rock analyses. Also, while post-precipitation under preferred conditions is generally quite small, there is frequently some post-precipitation. It is an object of this invention to further reduce post-precipitation under certain adverse conditions.

Analyses of solids found in post-precipitating Hill acid indicate two main types of precipitants. The first is a cubic or rhombic shaped crystal, the second is needle-shaped. The first appears to be principally an iron phosphate with perhaps some isomorphic aluminum replacing the iron. The second (the needles) appears to be mostly aluminum phosphate with perhaps some Fe replacing Al. Both have Ca, $SO_4$, and F, probably indicating calcium sulphate and calcium fluoride.

Typical analyses of solids of these two types are as follows:

| Component | Rhombic Crystals Wt. % | Needle Crystals Wt. % |
| --- | --- | --- |
| $P_2O_5$ | 57.80 | 55.26 |
| CaO | 0.65 | 3.15 |
| $SiO_2$ | 0.00 | 0.00 |
| $Fe_2O_3$ | 13.10 | 1.20 |
| $Al_2O_3$ | 4.00 | 9.20 |
| F | 1.03 | 3.73 |
| $H_2SO_4$ | 1.60 | 3.00 |
| MgO | 0.44 | 0.64 |
| $Na_2O$ | 0.06 | 0.11 |
| $K_2O$ | 0.02 | 0.11 |
| Mositure | 3.42 | — |
| Solubility | | |
| In water | 90 (approx.) | 81.40 |
| In methanol | 20 (approx.) | 50.80 |

EXAMPLE 1

A sample of 60% $P_2O_5$ Hill acid as above described, starting from phosphate rock high in Fe and Al, was found to have a precipitate consisting largely of crystals of the rhombic type above described. The solids was about 60 volume % of the total of liquid plus solids, and had an analysis approximating that of the "Rhombic Crystals" column in the table. A 135 g. sample of this acid having a temperature of 28° C. was heated to 80°–85° C. for 10 minutes, whereupon substantially all solids dissolved, and did not re-precipitate over an observation period of three months.

EXAMPLE 2

A run similar to that in Example 1 was made, except that the solids were the needle type, with approximately the analysis given in the "Needle Crystals" column in the table. The results were the same as in Example 1.

SOME PREFERRED EMBODIMENTS

Acid within the range 57–60% $P_2O_5$ carrying in suspension, or settled, about 80 volume percent of solids resulting from post precipitation, and preferably either of the rhombic type or the needle type works best with the process of this invention. An operable range of solids which can be put back into solution substantially permanently by the process of this invention is about 5 to 100 volume percent of acids plus solids; preferably this range is 20 to 80 volume percent. In commercial experience, the range is frequently even more narrow, namely, about 40 to 100 volume percent.

Heating is actually a time/temperature operation, which follows the well known law of doubling the speed of reaction with every 10° C. increase in temperature. Bearing this principle in mind, I have found that my best results are obtained in bringing the acid to about 60° to 85° C. for 10 minutes. Temperatures higher than this, and heating times longer than this can be used, but they serve no purpose, and in fact, if too long continued heating will tend to evaporate additional water from the acid, besides having a deleterious effect on the internals of the evaporator or the heater. A broad operable range is 55°–85° C.

The process of this invention is to be distinguished from various treatments of phosphoric acid known in the art, which simply involve heating. This instant process is particularly specific to Hill acid as above described, and further than that, is specific to Hill acid containing solids within the above ranges.

ANALYTICAL

Except for solids, analyses were made by procedures in "Methods Used and Adopted by the Association of Florida Phosphate Chemists", Fifth Ed., 1970 ("AFPC"). Where more than one method is provided, the selections were as follows:

P. Photometric method (phosphate rock), p. 80.
Iron oxide, Atomic absorption method, p. 42.
Aluminum oxide, Atomic absorption method, p. 95.
F. Specific ion electrode method, p. 104A.
Water, Karl Fischer method, p. 127.
Phosphoric acid in phosphoric acid, Total phosphoric acid method, p. 132.

Solids were determined by the following procedure:
Apparatus
 a. Vacuum filtration system
 b. Drying oven adjusted to 105° C.
 c. Gooch crucible, porcelain, with perforated bottom
Reagents
 a. Asbestos - Powminco brand or equivalent, special for Gooch crucibles, acid washed. This grade asbestos as received should be thick slurried with water and blended in a Waring blender or equivalent for 10 seconds. The blended slurry should then be placed in an Erlenmeyer flask and washed 3-5 times by adding distilled water and decanting to remove the extremely fine material. The washing is accomplished by thoroughly shaking the blended asbestos with each water wash and then allowing it to settle for 5-10 minutes before decantation of the excess water and fine material.

b. Methanol, absolute

Determination

Prepare the Gooch crucible with a pad of asbestos which filters freely under medium suction. (In lieu of asbestos, glass fibers can be used.) Pad should be thick enough to retain all suspended solids. Wash pad several times with distilled water, finally with methanol, and place in drying oven at 105° C. for a minimum of one hour. Remove from drying oven and place in desiccator until cool. Reject or rework crucibles which visually show evidence of pad separation from crucible walls. Weigh crucible rapidly and record tare weight. Resuspend solids in sample by shaking thoroughly. Immediately weigh approximately five-ten grams of sample, accurately weighed, into the crucible. Place the crucible and contents on a filter flask and filter with strong vacuum until all of the liquid portion has been filtered through. Wash the solids five times with five ml portions of methanol allowing each wash to filter through completely. Remove crucible from suction and place in the drying oven at 105° C. for a minimum of one hour. Cool in desiccator and weigh rapidly as soon as cool.

$$\% \text{ Suspended Solids} = \frac{\text{Weight of Residue}}{\text{Weight of Sample}} \times 100$$

In these analyses, samples are well shaken, then immediately analyzed. Thus, values for $P_2O_5$, lime, silica, iron, alumina, etc. include components in both liquid and solid phases.

I claim:

1. The method of preventing re-post precipitation in a wet process phosphoric acid analyzing about 57-63% $P_2O_5$ prepared by steps including treatment of 26-36% $P_2O_5$ acid with aluminum silicate followed by concentration to about 50%, removal of solids, and further concentration to 57-63%, with post precipitation of solids in an amount of 5 to 100% based on the total volume of acid plus solids, comprising heating the solids-containing 57-63% acid to a temperature in the range of about 55° to 85° C, whereupon the solids largely redissolve without subsequent re-precipitation.

2. Method according to claim 1 in which the acid analyzes about 60% $P_2O_5$.

3. Method according to claim 1 in which the solids are characterized largely by a rhombic crystal form, having an analysis approximately as follows:

| Component | Wt. % |
|---|---|
| $P_2O_5$ | 57.80 |
| CaO | 0.65 |
| $SiO_2$ | 0.00 |
| $Fe_2O_3$ | 13.10 |
| $Al_2O_3$ | 4.00 |
| F | 1.03 |
| $H_2SO_4$ | 1.60 |
| MgO | 0.44 |
| $Na_2O$ | 0.06 |
| $K_2O$ | 0.02 |
| Moisture | 3.42 |

4. Method according to claim 1 in which the solids are characterized largely by a needle shaped crystal form having an analysis approximately as follows:

| Component | Wt. % |
|---|---|
| $P_2O_5$ | 55.26 |
| CaO | 3.15 |
| $SiO_2$ | 0.00 |
| $Fe_2O_3$ | 1.20 |
| $Al_2O_3$ | 9.20 |
| F | 3.73 |
| $H_2SO_4$ | 3.00 |
| MgO | 0.64 |
| $Na_2O$ | 0.11 |
| $K_2O$ | 0.11 |
| Moisture | — |

5. Method according to claim 1 in which the temperature of heating is about 80° to 85° C.

6. Method according to claim 5 in which the acid is heated for about ten minutes.

* * * * *